US 8,024,271 B2

(12) United States Patent
Grant (10) Patent No.: US 8,024,271 B2
(45) Date of Patent: Sep. 20, 2011

(54) PURCHASING ALERT METHODS AND APPARATUS

(75) Inventor: David S. Grant, Mission Viejo, CA (US)

(73) Assignee: iXept, Inc., Beverly Hills, CA (US)

( * ) Notice: Subject to any disclaimer, the term of this patent is extended or adjusted under 35 U.S.C. 154(b) by 106 days.

(21) Appl. No.: 12/052,460

(22) Filed: Mar. 20, 2008

(65) Prior Publication Data

US 2008/0167990 A1      Jul. 10, 2008

Related U.S. Application Data

(63) Continuation of application No. 11/572,413, filed as application No. PCT/US2005/032068 on Sep. 9, 2005.

(60) Provisional application No. 60/609,591, filed on Sep. 13, 2004.

(51) Int. Cl.
*G06Q 40/00* (2006.01)
(52) U.S. Cl. .......................................... 705/40
(58) Field of Classification Search ...................... 705/40
See application file for complete search history.

(56) References Cited

U.S. PATENT DOCUMENTS

| 5,615,110 | A | 3/1997 | Wong |
| 5,708,422 | A * | 1/1998 | Blonder et al. ............. 340/5.41 |
| 6,105,006 | A | 8/2000 | Davis et al. |
| 7,039,611 | B2 | 5/2006 | Devine |
| 7,357,310 | B2 | 4/2008 | Calabrese et al. |
| 2002/0004770 | A1 * | 1/2002 | Phillips et al. .................. 705/34 |
| 2002/0133462 | A1 | 9/2002 | Shteyn |
| 2004/0049454 | A1 | 3/2004 | Kanno et al. |
| 2004/0059671 | A1 | 3/2004 | Nozaki et al. |
| 2004/0064406 | A1 | 4/2004 | Yates et al. |
| 2004/0068472 | A1 | 4/2004 | Sahota et al. |
| 2004/0103049 | A1 | 5/2004 | Kerr |
| 2006/0059110 | A1 | 3/2006 | Madhok et al. |
| 2006/0123092 | A1 | 6/2006 | Madams et al. |
| 2006/0282528 | A1 | 12/2006 | Madams et al. |
| 2007/0011261 | A1 | 1/2007 | Madams et al. |
| 2007/0143230 | A1 | 6/2007 | Narainsamy et al. |

FOREIGN PATENT DOCUMENTS

WO          WO 02/23412         3/2002

OTHER PUBLICATIONS

EFT Report; "Congress Decries Bank Violations of Terror Financing Laws"; V28, n12, Jun. 9, 2004. ISSN: 0195-7287.*
Allen, Doug; "Forum Systems 'XWall Web Services Firewall"; Network Magazine, 22, Apr. 1, 2004; ISSN: 1093-8001.*

(Continued)

*Primary Examiner* — Alexander Kalinowski
*Assistant Examiner* — Edward Chang
(74) *Attorney, Agent, or Firm* — Haynes and Boone, LLP (57) ABSTRACT

Systems and techniques for receiving transaction information at an authentication system. The transaction information may be processed using different rule sets, based on the financial instrument used for the transaction (for example, a particular credit card, debit card, bank account, brokerage account, and the like). One or more alerts may be generated and communicated to the user. The alerts may be formatted based on user device configuration information, such as a cell phone type, email type, and the like.

54 Claims, 3 Drawing Sheets

OTHER PUBLICATIONS

Business Wire; "Spains Bancaja Savings Bank Protects Cardholders form Fraud with Software from ACI Worldwide-Bancaja Licenses ACI Proactive Risk Manager to monitor Debit Card Transactions for Fraud"; May 7, 2003.*

Notification of Transmittal of the International Search Report and the Written Opinion of the International Searching Authority (1 page).
International Search Report (2 pages).
Written Opinion of the International Searching Authority (3 pages).

* cited by examiner

PURCHASING ALERT METHODS AND APPARATUS

CROSS REFERENCE TO RELATED APPLICATIONS

This application is a continuation application of U.S. patent application Ser. No. 11/572,413 filed Jan. 19, 2007, which is the National Stage of International Patent Application No. PCT/US2005/032068 filed Sep. 9, 2005, which claims the benefit of U.S. Provisional Patent Application No. 60/609,591 filed Sep. 13, 2004. The entire contents of such applications are hereby incorporated by reference.

BACKGROUND

1. Field of Invention

This invention generally relates to financial transactions, more particularly to communication of financial transaction information.

2. Related Art

The growth in credit card and online transaction use has been accompanied by a substantial growth in fraud and identity theft. For example, storage of credit card information on electronic information systems can enable large-scale credit card fraud.

Another common form of fraud is increasing the charge after the consumer has agreed to the fee or amount. For example, a small amount is added to a restaurant bill, service bill, or other transaction. Since consumers generally do not see the actual charges until their credit card statements arrive, this type of fraud is difficult to detect.

A number of systems are available to reduce the damage that may be caused by credit card fraud. For example, many financial institutions offer customers the ability to monitor their credit and other accounts by electronically accessing their accounts. Customers may then notify the financial institution if any improper transactions are noted.

Although consumers may increase their financial security using available systems, they may not provide optimal, efficient fraud mitigation.

SUMMARY

Systems and techniques financial transaction data authentication. In general, in one aspect, a method may comprise receiving at an authentication system first transaction information generated by a first financial institution for a first financial instrument registered to a user. The method may further comprise processing the first transaction information using a first rule set comprising one or more pre-selected rules associated with the first financial instrument. The method may further comprise receiving at the authentication system second transaction information generated by a second different financial institution for a second different financial instrument registered to the user, and processing the second transaction information using a second rule set.

In general, in other aspects, the systems and techniques may be implemented as software and/or hardware to authenticate financial transaction data.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein may allow for time-efficient and responsive monitoring of financial transaction information. Rather than providing information on an institution-by-institution basis, the current disclosure allows for rules-based analysis of transaction information from a number of different institutions. Additionally, transactions need not be verified before completion; instead, a user is given the flexibility to determine how transactions with different profiles are handled.

As noted above, a number of available techniques may be used to reduce fraud in financial transactions. However, the available techniques all fall short in that they provide piecemeal protection, rather than an efficient system for alerting consumers to transactions that affect their finances.

Figure 1:
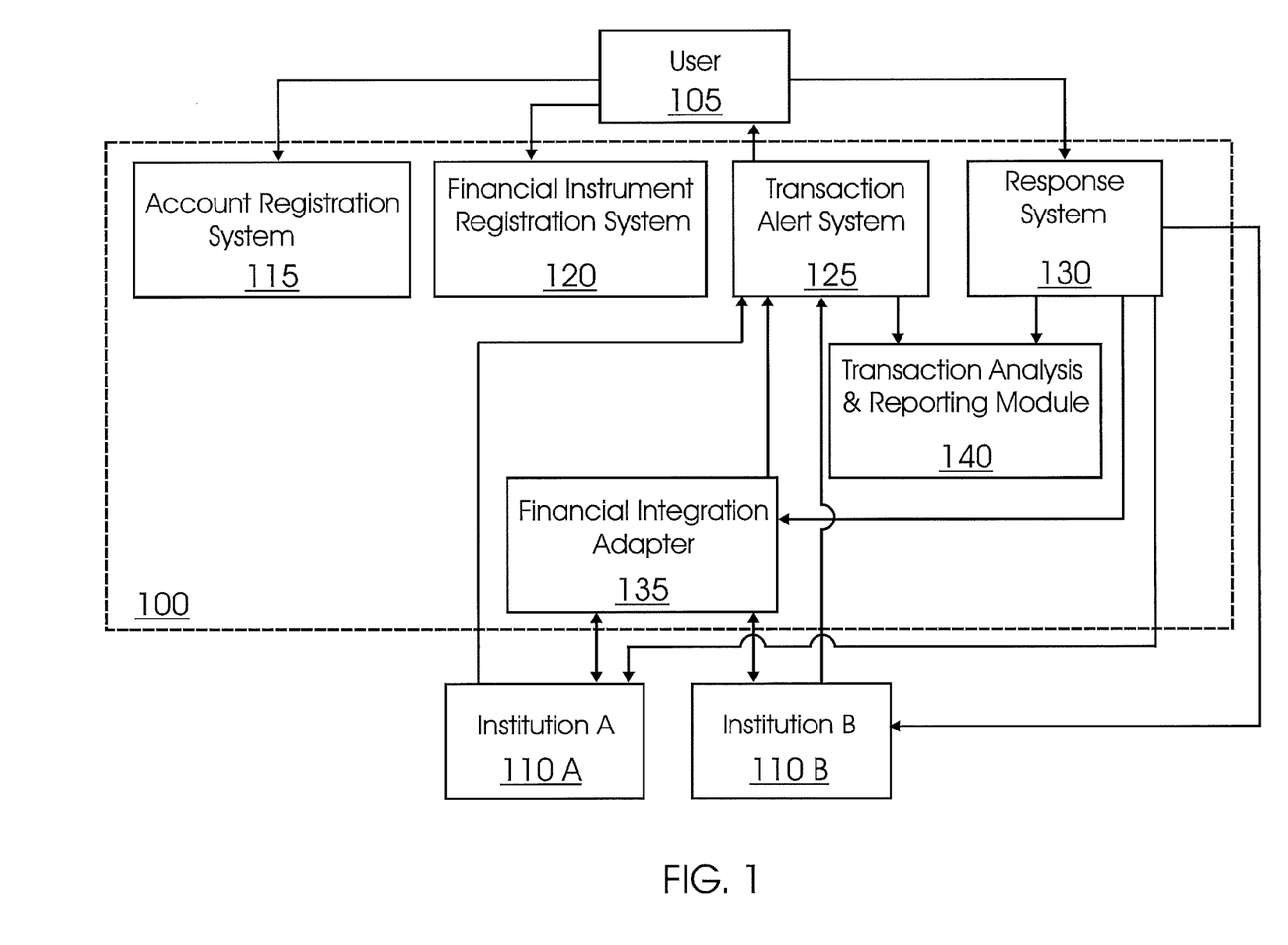
FIG. 1 is a diagram of a secure transaction system, according to some embodiments.

FIG. 1 shows a diagram of a security and authentication system 100 that may provide user-tailored financial transaction information quickly and reliably. Rather than providing transaction information on an institution by institution basis, system 100 enables a user 105 to obtain transaction information from a plurality of different financial institutions such as institution 110A and 110B.

System 100 includes an account registration system 115, and a financial instrument registration system 120. User 105 enrolls in system 100 using account registration system 115. For example, user 105 creates a user identifier and password, and provides profile information to account registration system 115.

In some embodiments, the profile information includes configuration information for the personal information systems on which the user will receive alerts. For example, the configuration may include information about the particular cell phone on which alerts will be received. Different cell phone types may process, display, and/or transmit information differently. By acquiring information indicative of the type of cell phone being used, system 100 can format alerts tailored to the type of cell phone, and can process responses from the cell phone efficiently.

In another example, the user may provide configuration information for an email system to be used for receiving alerts and/or generating responses. The user may indicate whether the email system is an IMAP system, VIM system, a POP system, or other type of email system. In response, system 100 can format alerts and/or process responses accordingly. Users may provide this configuration information by typing information in a text field, by selecting a cell phone type, email type, or other configuration from a menu such as a drop down menu, or in another manner (e.g., a setup email or text message exchange between the user device and system 100).

Once user 105 is enrolled in system 100, user 105 registers financial instruments using a financial instrument registration system 120. Typically, today's consumers have a number of financial instruments such as credit cards, debit cards, automatic teller machine cards, bank accounts, brokerage accounts, and the like. A user's financial instruments are frequently distributed among a number of different financial institutions. As noted above, this may make transaction monitoring difficult and impractical. System 100 may provide for simple, real-time monitoring of a user's financial instruments.

To begin the financial instrument registration process, user 105 may provide financial institution information for institutions 110A and 110B, and identifier information for a plurality of financial instruments at institutions 110A and 110B.

For example, institution 110A may be a bank, and institution 110B may be a brokerage. User 105 may provide bank information, such as a name, address, ABA transit/routing number, and the like for institution 110A. User 105 may provide account information for institution 110A, such as one or more credit card numbers, account numbers, and the like. For institution 110B, user 105 may provide identifying information for the particular brokerage, as well as account information.

Financial instrument registration system 120 may process the information for institutions 110A and 110B to validate each financial instrument registered, either during the registration process or as part of an initial setup process. The validation may use existing networks such as credit card processors before the particular financial instrument is associated with user 105, and data associated with the financial instrument is stored.

User 105 may also select rules for handling particular transactions, either as part of an initial enrollment process, or at some other point. For example, user 105 may define rules for particular financial instruments, for particular types of transactions, for particular vendors (or other transaction participants), and/or other types of rules (such as geographical rules). Rule definition and application are discussed more fully below.

In operation, system 100 may receive transaction information from institution 110A and institution 110B, and provide the transaction information to user 105 using a transaction alert system 125, described below. The transaction information may be provided in the form of an alert, notifying the user that a transaction has occurred, and including relevant details about the transaction.

In some implementations, system 100 includes a financial integration adapter 135. Financial integration adapter 135 may be implemented, for example, at least partially on a server (or in another manner) at financial institution 110A and/or 110B, so that at least some of adapter 135 is secured by the institution. Financial integration adapter 135 allows system 100 to report transactions to user 105, and to receive responses from user 105 without storing actual credit card numbers, account numbers, etc. Instead, the financial integration adapter 135 allows for generating a unique identifier that cloaks the account number information, but which may still be used to identify the transaction. The identifier may be encrypted, and stored in a memory of system 100.

For example, the unique identifier may include information indicative of a partial account number (e.g., the last four digits of the account number), so that user 105 may easily identify the particular account, without storing the entire account number. Alternately, the unique identifier may comprise a random GUID (guaranteed unique user ID). Storing an identifier different than the actual account number may substantially improve the security of system 100.

In some embodiments, financial integration adapter 135 may also enable legacy systems to capture transactions from the legacy system to financial integration adapter 135. Financial integration adapter 135 may also implement an inherent transaction filter. With an inherent transaction filter, transaction information may be filtered as part of adapter 135, before transmission from the financial institutions. Financial institutions need only send transaction information (e.g., name, card identifier, vendor information, transaction amount, date and time) for consumers who are enrolled in system 100. In the absence of an inherent transaction filter, transaction information for each transaction at the financial institution may need to be sent. Further, by distributing the rule service (e.g., implementing at least some rule functionality at adapter 135), alerts may be sent only for some enrolled users/transactions. Thus, the number of transactions outbound from financial institutions may be significantly reduced.

As noted above, transaction information may be provided to user 105 using transaction alert system 125, either via financial integration adapter 135, or directly. The inbound transaction is cross-referenced to identify the financial instrument information (e.g., user account information and credit card information).

Transaction alert system 125 may implement a number of user-specified rules. Rules may be implemented differently for different financial instruments (e.g., for different credit cards, or for different account types), or some rule sets may be used for more than one financial instrument. Therefore, user 105 is able to customize system 100 for his or her particular financial situation.

The user-specified rules may include vendor-specific rules, vendor-type rules, geographic rules, transaction profile rules, and/or other rules. The user-specified rules may also detail the method by which user 105 is notified of the transaction (e.g., by cell phone, e-mail, pager, and/or other method), and may also govern notification timing (e.g., send all notifications upon processing of transaction information, send some notifications daily, and the like).

Some example rules are as follows:
Vendor Specific Rules
Always trust this vendor regardless of the transaction amount
Trust this vendor if the transaction amount is included in a range
Trust this vendor only for transactions of a distinct amount
Trust this vendor for a distinct amount on a specific date
Trust this vendor if the transaction amount is included in a range, on a specific date
Transaction Profile Rules
Send notification if multiple transactions from the same vendor within particular time interval
Send notification if more than a minimum number of transactions in a pre-determined time interval
Geographic Rules
Send notification if transaction outside particular geographic area (e.g., using a zip code/area code list)
Send notification if transaction is within a particular geographic area
Notification Method Rules
Transmit message to cell phone model and cell number
Transmit message to one or more emails
Transmit message to cell first, then list of one or more emails
Send Page Message
Transmit message via automated phone call Rule-based transaction processing may allow user 105 to limit the received messages to a manageable number so that he is immediately notified of transactions that are suspect, but need not be immediately notified of certain transactions (e.g., expected, repeated transactions such as automatic mortgage payments). That is, a particular user may have fifty transactions on a particular day. However, some of the transactions may be trusted transactions for which the system does not generate an alert. Other transactions may be transactions that are grouped into a single alert (e.g., trusted transactions for which the user selects a daily email and/or cell phone notification).

The user may thus create a rule profile that optimizes the number of received alerts for his particular needs. If the user finds that he is receiving an excessive number of alerts based on his initial rule profile, he may modify the rule profile to reduce the number of received alerts. Similarly, if the user determines that he would like to receive more alerts (for example, to increase the security of his financial transactions), he can modify his rule profile to send alerts for more transactions.

Transaction information received from institutions 110A and 110B may be processed; combined with response option information and/or alert identification information (such as an alert number and alert time); formatted based on one or more delivery methods; and packaged as an alert message. The alert message may then be communicated to user 105 via one or more selected communication methods.

Upon receipt, user 105 may respond to the alert. For example, user 105 may respond to a cell phone text message alert by replying to the text message either confirming the transaction, flagging the transaction for auditing, or denying the transaction. The response may be received in a response system 130. Response system 130 may monitor for response messages (e.g., return e-mails, return cell phone calls, etc.), and reconcile received responses with associated transaction alerts.

Responses may be associated with the corresponding transaction alert and stored in response system 130. If two or more responses associated with the same transaction alert are received, response system 130 may reconcile the multiple responses. For example, response system 130 may react to the first response, the last response, or may implement some other method to reconcile the multiple responses.

Response system 130 may also transmit information to associated institutions to trigger downstream processes based on the response information. For example, institution 110A may receive a communication from system 100 indicating that a particular transaction should be denied. As a result, institution 110A may deny the transaction, and may initiate one or more additional processes, such as associating a global fraud alert with the particular financial instrument, or communicating fraud information to law enforcement.

System 100 may further include a transaction analysis and reporting module 140. Module 140 may store transaction and response information for each transaction, so that consumers may view purchase information, and may reconcile charges rapidly. Module 140 may implement reconciliation rules for particular types of alerts and/or responses.

For example, module 140 may implement rules such as the following exemplary rules:

Trusted transactions: all trusted transactions were filtered and therefore not sent as alerts. Trusted transactions are grouped as trusted, and need not be reviewed.

Verified transactions: all verified transactions are already reconciled and need not be reviewed.

Audit transactions: transactions flagged as audit are grouped together for easy viewing. These transactions may be marked as verified and automatically reconciled, or denied based on the user's review. Note that when a status for a transaction is modified, response system 130 may re-evaluate the transaction, and may take further action.

Denied transactions: transactions that were denied appear together for easy viewing. The information may be used to assist financial underwriters in recovering loss or preventing further fraud. The status of denied transactions may be changed if the status was incorrect, or if new information becomes available.

System 100 may further provide financial transaction information in a format to be used by programs such as Quicken and Microsoft Money. System 100 may incorporate a flat file template processor to import transactions from other sources. The user may thus get a truly global view of his or her financial transaction activity.

Figure 2:
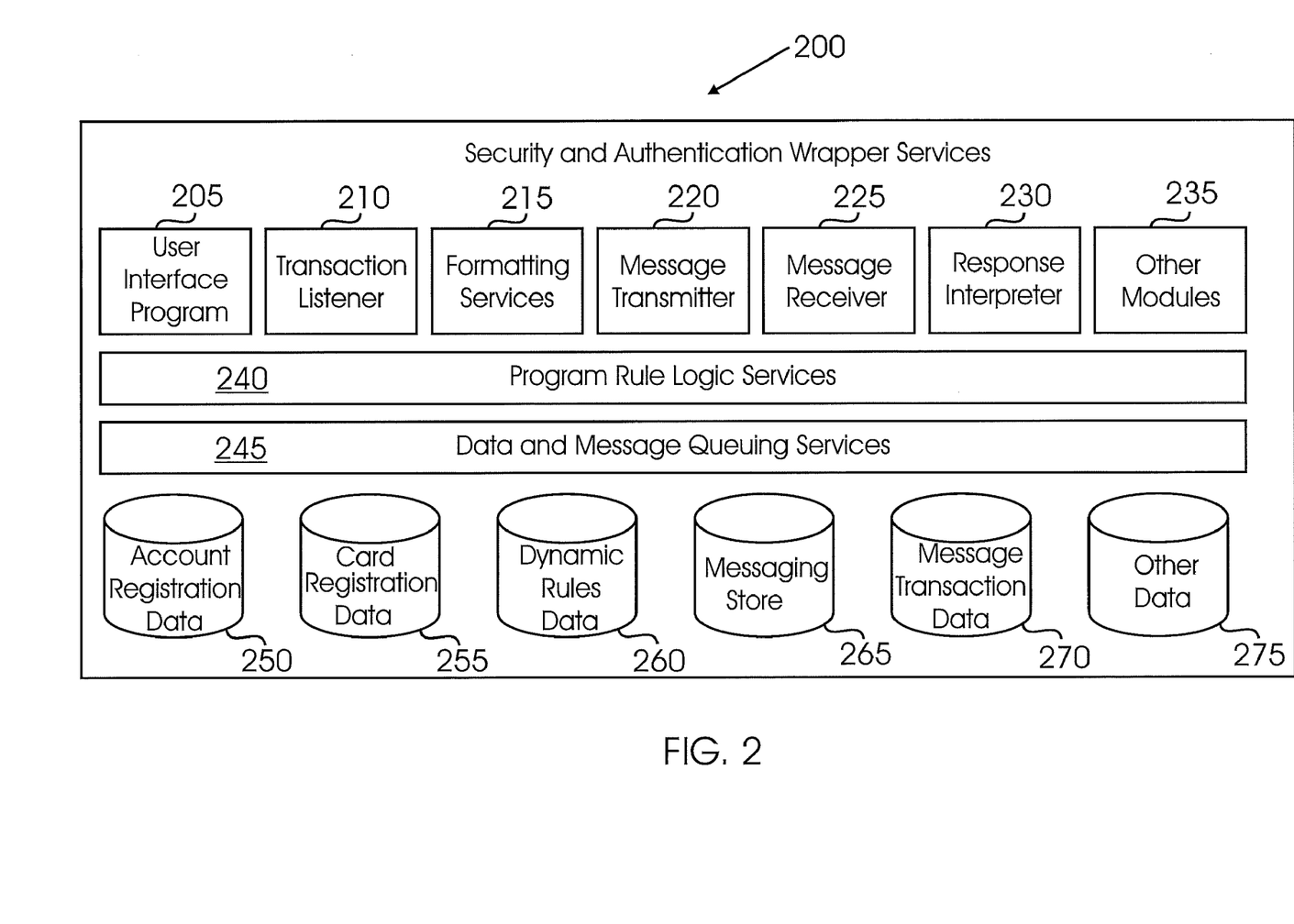
FIG. 2 is a diagram of an information system for a secure transaction system, according to some embodiments.

FIG. 2 shows a schematic of an information system 200 for a secure transaction system, according to some embodiments. System 200 comprises data and instructions to implement the functionality illustrated in FIG. 3 and described below, which may be stored on one or more machine-readable media (e.g., one or more memory modules) and may be executed by one or more processors (e.g., one or more microprocessors).

System 200 includes a user interface program 205. User interface program 205 includes data and instructions to generate user interface data so that a user can interact with system 200. For example, the user interface data may be transmitted to a user system, and cause the user system to display one or more graphical user interfaces (GUIs). In response, the user can select items on the GUI, so that response data is provided to system 200. User interface program 205 is used to facilitate user interaction with system 200; for example, user enrollment, user information acquisition, and the like.

User interaction may comprise a number of activities. For example, a user may interact with system 200 via one or more GUIs to enroll in the security and authentication system. A user may register one or more credit cards with system 200, may register one or more financial accounts with system 200, or may register one or more other financial instruments with system 200 (e.g., debit cards, stock accounts, or other financial instruments). A user may also interact with system 200 to select, develop, and/or modify transaction processing rules.

System 200 may include a transaction listener 210. Transaction listener 210 may receive transaction data from a plurality of financial entities. For example, transaction listener 210 may receive transaction data transmitted by a first financial entity of the plurality of financial entities based on execution of a transaction on an information system of the first financial entity. The transmitted data may include data indicative of a financial instrument identifier (e.g., indicative of a credit card number), data indicative of a transaction type (e.g., purchase), data indicative of a transaction description (e.g., vendor information for a purchase), data indicative of a transaction amount, and/or other data.

In another example, transaction listener 210 may receive transaction data in response to polling a plurality of financial entities. In response, the financial entities may transmit transaction data for recent transactions to transaction listener 210.

System 200 may further include formatting services 215. Formatting services 215 may receive transaction data from transaction listener 210, determine an associated financial instrument using card registration data 255, and determine an associated user using account registration data 250. Formatting services 215 may format the transaction data to transmit related information to the associated user, according to one or more rules included in dynamic rules data 260 and implemented by program rule logic services 240. For example, formatting services 215 may format the transaction data to be transmitted to a particular cell phone type using account registration data 250.

For example, formatting services 215 may receive data indicative of a credit card purchase transaction for a particular user. Formatting services 215 may generate an email notification for the particular user, including identification information for the credit card (such as a truncated credit card number), the date, time, vendor identification, transaction amount, and/or other transaction information. System 200 may store messaging information in messaging store 265, as well as storing message transaction data 270.

System 200 may transmit transaction information to the user using a message transmitter 220, where the transmission may be coordinated using data and message queuing services 245.

When the user receives the alert, the user may take a number of actions. The user may approve the transaction, may deny the transaction, may flag the transaction for audit, or may take another action. The user may transmit a response to system 200, which is received by message receiver 225, and interpreted by response interpreter 230 (for example, using configuration information for the user's cell phone, email, and the like).

System 200 may include other modules; for example, a transaction data formatting module to format transaction data to be used by external programs, such as Quicken, Microsoft Money, or other program. System 200 may further store other data 275.

Figure 3:
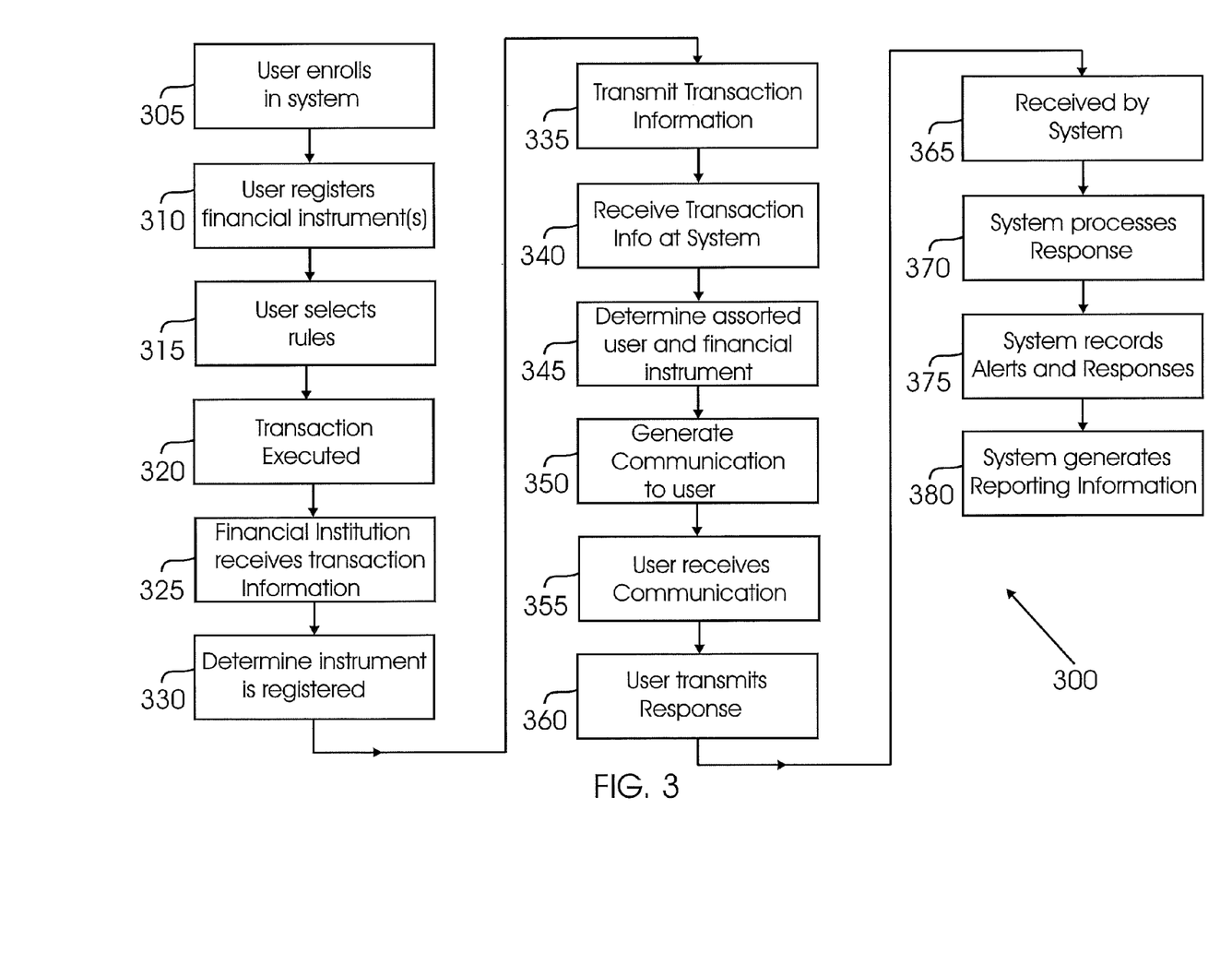
FIG. 3 is a flow chart illustrating a method for reducing fraud in financial transactions.

FIG. 3 shows a security and authentication process 300 that may be used, in some embodiments. At 305, a user may enroll in an authentication system such as the systems described above. At 310, a user may register one or more financial instruments with the authentication system.

In some embodiments, a user may access the authentication system to register one or more financial instruments (for example, a user may register a credit card via an Internet browser). In other embodiments, the user may register the financial instruments in the authentication system via the associated financial institution. For example, a bank may offer customers the option of authentication system registration for each account, credit card, and the like. The registration process may then be negotiated by the authentication system and financial institution.

At 315, the user may generate and/or select one or more rules to govern alert handling for one or more financial instruments. The authentication system may present a number of pre-defined rules to the user, who may select individual rules or collections of rules (rule profiles). The user may generate rules using one or more pre-defined rule portions.

At 320, a transaction may be executed using a registered financial instrument. At 325, the associated financial institution (or other party) may receive transaction information for transaction. The financial institution may determine that the financial instrument is registered at 330, and may transmit transaction information to the authentication system at 335.

At 340, the authentication system may receive transaction information. At 345, the authentication system may determine an associated user and associated financial instrument based on the received information. At 350, the authentication system may generate one or more communications to the associated user, according to the pre-selected rules for the financial instrument.

At 355, the user may receive one or more communications. At 360, the user may transmit a response to at least one of the communications, which may be received by the authentication system at 365.

At 370, the authentication system may process the response, and may take one or more actions based on the response. For example, the authentication system may communicate the response to the financial institution for further action (e.g., notifying authorities, placing a fraud alert on the particular financial instrument). At 375, the system may reconcile alerts and responses, and at 380 may generate reporting information for the user.

In implementations, the above described techniques and their variations may be at least partially implemented as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A machine-implemented method comprising:
storing a plurality of rule sets associated with a plurality of financial instruments in a memory;
receiving transaction information, wherein the transaction information is associated with one of the financial instruments and identifies a financial transaction that has already been executed using the financial instrument;
processing the transaction information using one of the rule sets comprising one or more rules associated with the financial instrument;
selectively generating an alert communication in response to the processing, wherein the alert communication identifies the financial transaction;
passing the alert communication to an entity over a network, wherein the alert communication is configured to permit the entity to optionally reply directly to the alert communication;
wherein the receiving, processing, generating, and passing are performed by a transaction alert system after the financial transaction has already been executed and without interfering with execution of the financial transaction;
receiving a response message from the entity at a response system in direct reply to the alert communication after the financial transaction has already been executed and without interfering with the execution of the financial transaction;
wherein the response message from the entity includes a designation provided by the entity concerning the financial transaction; and
wherein the execution of the financial transaction is not conditioned on the designation included in the response message.

2. The method of claim 1, wherein the designation is selected by the entity from a set of possible designations comprising at least a confirm designation and a deny designation.

3. The method of claim 1, wherein:
the receiving transaction information comprises receiving the transaction information from a financial institution;
the alert communication does not require the entity to directly contact the financial institution to provide the response message; and the method further comprises informing the financial institution of the response message, wherein the informing is performed by the response system.

4. The method of claim 1, wherein the designation is selected by the entity from a set of possible designations comprising at least a confirm designation, a flagged designation, and a deny designation.

5. The method of claim 1, wherein the entity is a user.

6. The method of claim 5, wherein the one of the rule sets is specified by the user.

7. The method of claim 1, wherein the one of the rule sets is specified by a financial institution.

8. The method of claim 1, wherein the financial instrument is a credit card, a debit card, an automatic teller machine card, a bank account, or a brokerage account.

9. The method of claim 1, wherein the alert communication is a cell phone text message, an email, or a voice message.

10. The method of claim 1, wherein the one or more rules comprise a vendor-specific rule, a vendor-type rule, a geographic rule, or a transaction profile rule.

11. The method of claim 1, wherein the transaction information is first transaction information, the financial instrument is a first financial instrument, the rule set is a first rule set, the financial transaction is a first financial transaction, the alert communication is a first alert communication, and the response message is a first response message, the method further comprising:
receiving second transaction information, wherein the second transaction information is associated with a second one of the financial instruments and identifies a second financial transaction that has already been executed using the second financial instrument;
processing the second transaction information using a second one of the rule sets comprising one or more rules associated with the second financial instrument;
selectively generating a second alert communication in response to the processing the second transaction information, wherein the second alert communication identifies the second financial transaction;
passing the second alert communication to the entity over a network, wherein the second alert communication is configured to permit the entity to optionally reply directly to the second alert communication;
wherein the receiving, processing, generating, and passing for the second transaction information and the second alert communication are performed by the transaction alert system after the second financial transaction has already been executed and without interfering with execution of the second financial transaction;
receiving a second response message from the entity at the response system in direct reply to the second alert communication after the second financial transaction has already been executed and without interfering with the execution of the second financial transaction;
wherein the second response message from the entity includes a designation provided by the entity concerning the second financial transaction; and
wherein the execution of the second financial transaction is not conditioned on the designation included in the second response message.

12. A system comprising:
a memory configured to store a plurality of rule sets associated with a plurality of financial instruments;
a transaction alert system configured to:
receive transaction information, wherein the transaction information is associated with one of the financial instruments and identifies a financial transaction that has already been executed using the financial instrument,
process the transaction information using one of the rule sets comprising one or more rules associated with the financial instrument,
selectively generate an alert communication in response to the processing, wherein the alert communication identifies the financial transaction,
pass the alert communication to an entity over a network, wherein the alert communication is configured to permit the entity to optionally reply directly to the alert communication, and
perform the receive, process, generate, and pass operations after the financial transaction has already been executed and without interfering with execution of the financial transaction;
a response system configured to receive a response message in direct reply to the alert communication after the financial transaction has already been executed and without interfering with the execution of the financial transaction;
wherein the response message from the entity includes a designation provided by the entity concerning the financial transaction; and
wherein the execution of the financial transaction is not conditioned on the designation included in the response message.

13. The system of claim 12, wherein the designation is selected by the entity from a set of possible designations comprising at least a confirm designation and a deny designation.

14. The system of claim 12, wherein:
the transaction information is received from a financial institution;
the alert communication does not require the entity to directly contact a financial institution to provide the response message; and
the response system is further configured to inform the financial institution of the response message.

15. The system of claim 12, wherein the designation is selected by the entity from a set of possible designations comprising at least a confirm designation, a flagged designation, and a deny designation.

16. The system of claim 12, wherein the entity is a user.

17. The system of claim 16, wherein the one of the rule sets is specified by the user.

18. The system of claim 12, wherein the one of the rule sets is specified by a financial institution.

19. The system of claim 12, wherein the financial instrument is a credit card, a debit card, an automatic teller machine card, a bank account, or a brokerage account.

20. The system of claim 12, wherein the alert communication is a cell phone text message, an email, or a voice message.

21. The system of claim 12, wherein the one or more rules comprise a vendor-specific rule, a vendor-type rule, a geographic rule, or a transaction profile rule.

22. The system of claim 12, wherein the transaction information is first transaction information, the financial instrument is a first financial instrument, the rule set is a first rule set, the financial transaction is a first financial transaction, the alert communication is a first alert communication, and the response message is a first response message,
wherein the transaction alert system is further configured to:
receive second transaction information, wherein the second transaction information is associated with a second one of the financial instruments and identifies a second financial transaction that has already been executed using the second financial instrument, process the second transaction information using a second one of the rule sets comprising one or more rules associated with the second financial instrument, selectively generate a second alert communication in response to the processing the second transaction information, wherein the second alert communication identifies the second financial transaction, pass the second alert communication to the entity over a network, wherein the second alert communication is configured to permit the entity to optionally reply directly to the second alert communication, and wherein the receive, process, generate, and pass operations for the second transaction information and the second alert communication are performed by the transaction alert system after the second financial transaction has already been executed and without interfering with the second financial transaction;

wherein the response system is configured to receive a second response message in direct reply to the second alert communication after the second financial transaction has already been executed and without interfering with the execution of the second financial transaction;

wherein the second response message from the entity includes a designation provided by the entity concerning the second financial transaction; and wherein the execution of the second financial transaction is not conditioned on the designation included in the second response message.

23. A machine-implemented method comprising:

receiving an alert communication at a device, wherein:

the alert communication identifies a financial transaction that has already been executed using a financial instrument and is configured to permit an entity to optionally reply directly to the alert communication using the device, the alert communication is received in response to a rule-based process performed on transaction information associated with the financial transaction, and the rule-based process uses at least one of a plurality of rule sets associated with a plurality of financial instruments to selectively generate the alert communication;

receiving an input from the entity in response to the alert communication;

generating a response message in direct reply to the alert communication based on the input;

wherein the response message from the entity includes a designation provided by the entity concerning the financial transaction;

wherein execution of the financial transaction is not conditioned on the designation included in the response message; and wherein the method is performed by one or more processors configured to execute software instructions which, when executed by the one or more processors, cause the device to perform the method after the financial transaction has already been executed and without interfering with the execution of the financial transaction.

24. The method of claim 23, wherein the device is a cell phone.

25. The method of claim 23, wherein the alert communication is generated by a financial institution.

26. The method of claim 23, wherein the designation is selected by the entity from a set of possible designations comprising at least a confirm designation and a deny designation.

27. The method of claim 23, wherein the alert communication does not require the entity to directly contact a financial institution to provide the response message.

28. The method of claim 23, wherein the designation is selected by the entity from a set of possible designations comprising at least a confirm designation, a flagged designation, and a deny designation.

29. The method of claim 23, wherein the entity is a user and the device is a user device.

30. The method of claim 29, wherein the one of the rule sets is specified by the user.

31. The method of claim 23, wherein the one of the rule sets is specified by a financial institution.

32. The method of claim 23, wherein the financial instrument is a credit card, a debit card, an automatic teller machine card, a bank account, or a brokerage account.

33. The method of claim 23, wherein the alert communication is a cell phone text message, an email, or a voice message.

34. The method of claim 23, wherein the one or more rules comprise a vendor-specific rule, a vendor-type rule, a geographic rule, or a transaction profile rule.

35. The method of claim 23, wherein the transaction information is first transaction information, the financial instrument is a first financial instrument, the rule-based process is a first rule-based process, the rule set is a first rule set, the financial transaction is a first financial transaction, the alert communication is a first alert communication, the input is a first input, and the response message is a first response message, the method further comprising:

receiving a second alert communication at the device, wherein:

the second alert communication identifies a second financial transaction that has already been executed using a second financial instrument and is configured to permit the entity to optionally reply directly to the second alert communication using the device, the second alert communication is received in response to a second rule-based process performed on second transaction information associated with the second financial transaction, and the second rule-based process uses at least a second one of the rule sets to selectively generate the second alert communication;

receiving a second in input from the entity in response to the second alert communication;

generating a second response message in direct reply to the second alert communication based on the second input;

wherein the second response message from the entity includes a designation provided by the entity concerning the second financial transaction;

wherein execution of the second financial transaction is not conditioned on the designation included in the second response message; and wherein the receiving the second alert communication, the receiving the second input, and the generating the second response message are performed by the one or more processors after the second financial transaction has already been executed and without interfering with the execution of the second financial transaction.

36. A device comprising:
one or more processors configured to execute software instructions which, when executed by the one or more processors, cause the device to perform a method comprising:
receiving an alert communication at the device, wherein:
the alert communication identifies a financial transaction that has already been executed using a financial instrument and is configured to permit an entity to optionally reply directly to the alert communication using the device,
the alert communication is received in response to a rule-based process performed on transaction information associated with the financial transaction, and
the rule-based process uses at least one of a plurality of rule sets associated with a plurality of financial instruments to selectively generate the alert communication; and
receiving an input from the entity in response to the alert communication;
generating a response message in direct reply to the alert communication based on the input;
wherein the response message from the entity includes a designation provided by the entity concerning the financial transaction;
wherein execution of the financial transaction is not conditioned on the designation included in the response message; and
wherein the device is configured to perform the method after the financial transaction has already been executed and without interfering with the execution of the financial transaction.

37. The device of claim 36, wherein the device is a cell phone.

38. The device of claim 36, wherein the alert communication is generated by a financial institution.

39. The device of claim 36, wherein the designation is selected by the entity from a set of possible designations comprising at least a confirm designation and a deny designation.

40. The device of claim 36, wherein the alert communication does not require the entity to directly contact a financial institution to provide the response message.

41. The device of claim 36, wherein the designation is selected by the entity from a set of possible designations comprising at least a confirm designation, a flagged designation, and a deny designation.

42. The device of claim 36, wherein the entity is a user and the device is a user device.

43. The device of claim 42, wherein the one of the rule sets is specified by the user.

44. The device of claim 36, wherein the one of the rule sets is specified by a financial institution.

45. The device of claim 36, wherein the financial instrument is a credit card, a debit card, an automatic teller machine card, a bank account, or a brokerage account.

46. The device of claim 36, wherein the alert communication is a cell phone text message, an email, or a voice message.

47. The device of claim 36, wherein the one or more rules comprise a vendor-specific rule, a vendor-type rule, a geographic rule, or a transaction profile rule.

48. The device of claim 36, wherein the transaction information is first transaction information, the financial instrument is a first financial instrument, the rule-based process is a first rule-based process, the rule set is a first rule set, the financial transaction is a first financial transaction, the alert communication is a first alert communication, the input is a first input, and the response message is a first response message, the method further comprising:
receiving a second alert communication at the device, wherein:
the second alert communication identifies a second financial transaction that has already been executed using a second financial instrument and is configured to permit the entity to optionally reply directly to the second alert communication using the device,
the second alert communication is received in response to a second rule-based process performed on second transaction information associated with the second financial transaction, and
the second rule-based process uses at least a second one of the rule sets to selectively generate the second alert communication;
receiving a second input from the entity in response to the second alert communication;
generating a second response message in direct reply to the second alert communication based on the second input;
wherein the second response message from the entity includes a designation provided by the entity concerning the second financial transaction;
wherein execution of the second financial transaction is not conditioned on the designation included in the second response message; and
wherein the device is configured to perform the receiving the second alert communication, the receiving the second input, and the generating the second response message after the second financial transaction has already been executed and without interfering with the execution of the second financial transaction.

49. The method of claim 1, further comprising storing the response message in a memory.

50. The system of claim 12, further comprising another memory configured to store the response message.

51. The method of claim 1, wherein each financial instrument is associated with a different financial institution.

52. The system of claim 12, wherein each financial instrument is associated with a different financial institution.

53. The method of claim 23, wherein each financial instrument is associated with a different financial institution.

54. The device of claim 36, wherein each financial instrument is associated with a different financial institution.

* * * * *